United States Patent [19]

Lytel et al.

[11] Patent Number: 5,039,189

[45] Date of Patent: Aug. 13, 1991

[54] OPTICAL SIGNAL DISTRIBUTION NETWORK AND METHOD OF CONVERTING INDEPENDENT OPTICAL/ELECTRICAL SIGNALS

[75] Inventors: Richard S. Lytel, Mountain View; Anthony J. Ticknor, Cupertino, both of Calif.

[73] Assignee: Lockheed Missiles & Space Company, Inc., Sunnyvale, Calif.

[21] Appl. No.: 505,614

[22] Filed: Apr. 6, 1990

[51] Int. Cl.⁵ .................... G02B 6/26; H04J 3/00; G02F 1/00
[52] U.S. Cl. .................... 385/2; 385/14; 385/48; 359/115; 359/164; 359/173
[58] Field of Search .............. 350/96.11, 96.12, 96.13, 350/96.14, 96.15, 96.16, 96.17, 320; 250/227.11; 370/1, 3, 4; 455/610, 613, 612, 617

[56] References Cited

U.S. PATENT DOCUMENTS

| | | | |
|---|---|---|---|
| 3,986,020 | 10/1976 | Kogelnik | 350/96.13 |
| 4,217,598 | 8/1980 | d'Auria et al. | 350/96.16 X |
| 4,342,499 | 8/1982 | Hicks, Jr. | 350/96.15 |
| 4,436,365 | 3/1984 | Hodgins et al. | 350/96.16 |
| 4,616,898 | 10/1986 | Hicks, Jr. | 350/96.15 |
| 4,662,715 | 5/1987 | Shutterly | 350/96.16 |
| 4,749,248 | 6/1988 | Aberson, Jr. et al. | 350/96.16 |
| 4,776,661 | 10/1988 | Handa | 350/96.12 X |
| 4,824,199 | 4/1989 | Uken | 350/96.15 |
| 4,887,879 | 12/1989 | Prucnal et al. | 350/96.15 |
| 4,948,218 | 8/1990 | Kobayashi et al. | 350/96.16 |

Primary Examiner—Brain Healy
Attorney, Agent, or Firm—John J. Morrissey

[57] ABSTRACT

A network for distributing a set of independent high-frequency electrical signals comprises an optical rail waveguide that is fed with a measured amount of optical power from a single source, and a set of optical railtaps positioned at sequential locations along the optical rail waveguide. Each optical railtap functions to extract a corresponding specified fraction of the measured amount of optical power from the optical rail waveguide when a corresponding one of the independent electrical signals is applied thereto. The fractions of the measured amount of optical power extracted from the optical rail waveguide at the corresponding sequential locations along the optical rail waveguide constitute a set of independent high-frequency optical signals, which correspond to the independent high-frequency electrical signals.

25 Claims, 5 Drawing Sheets

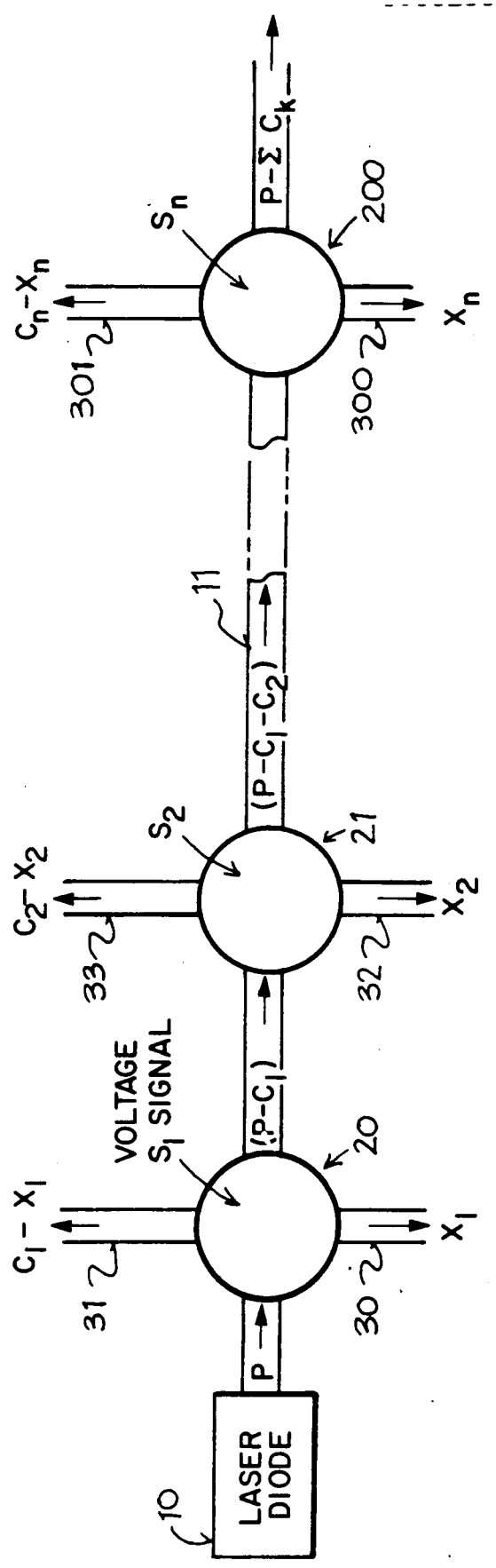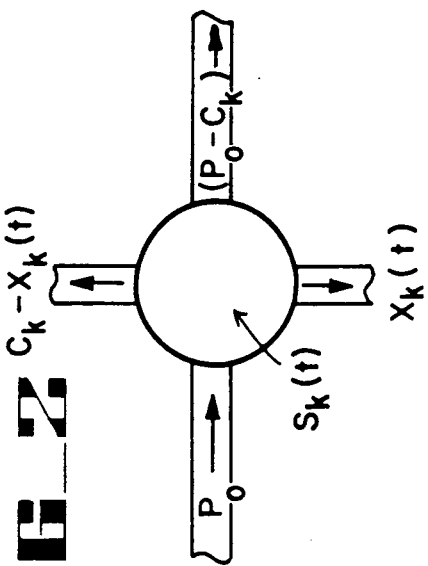

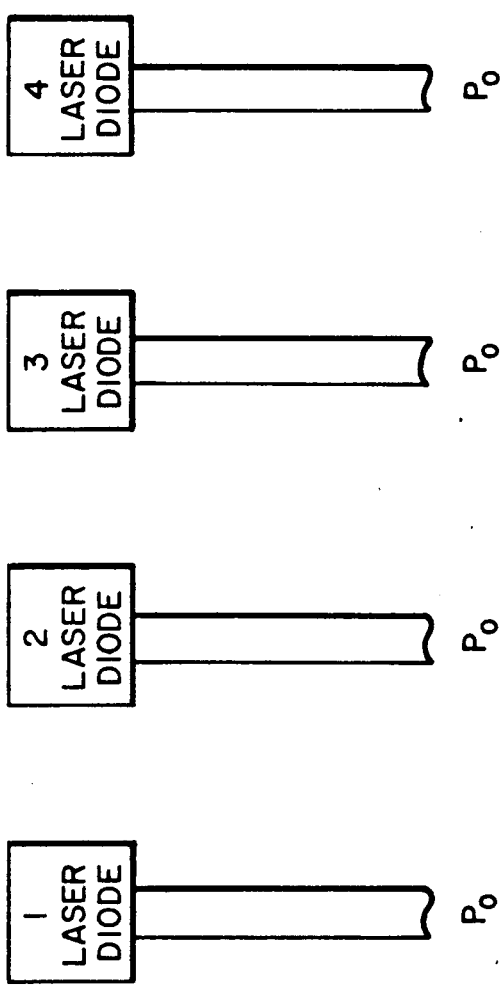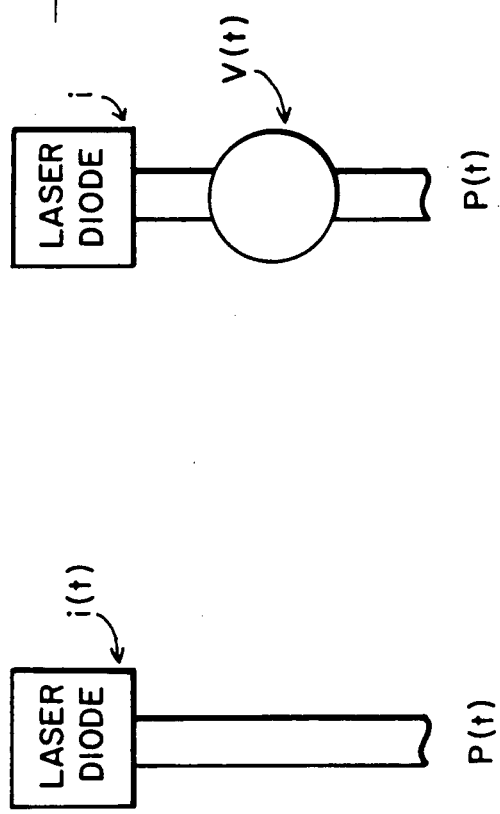

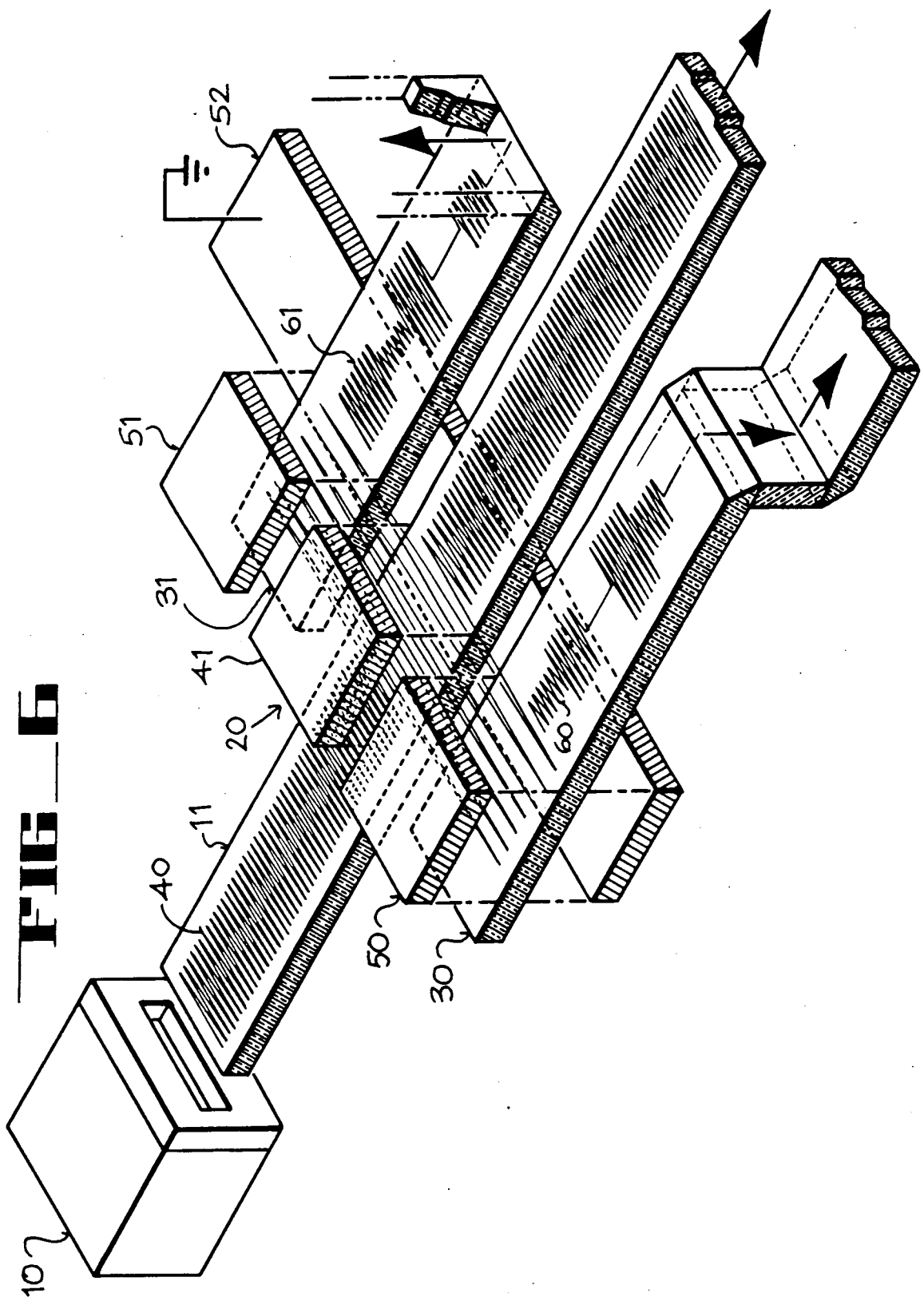
FIG_6

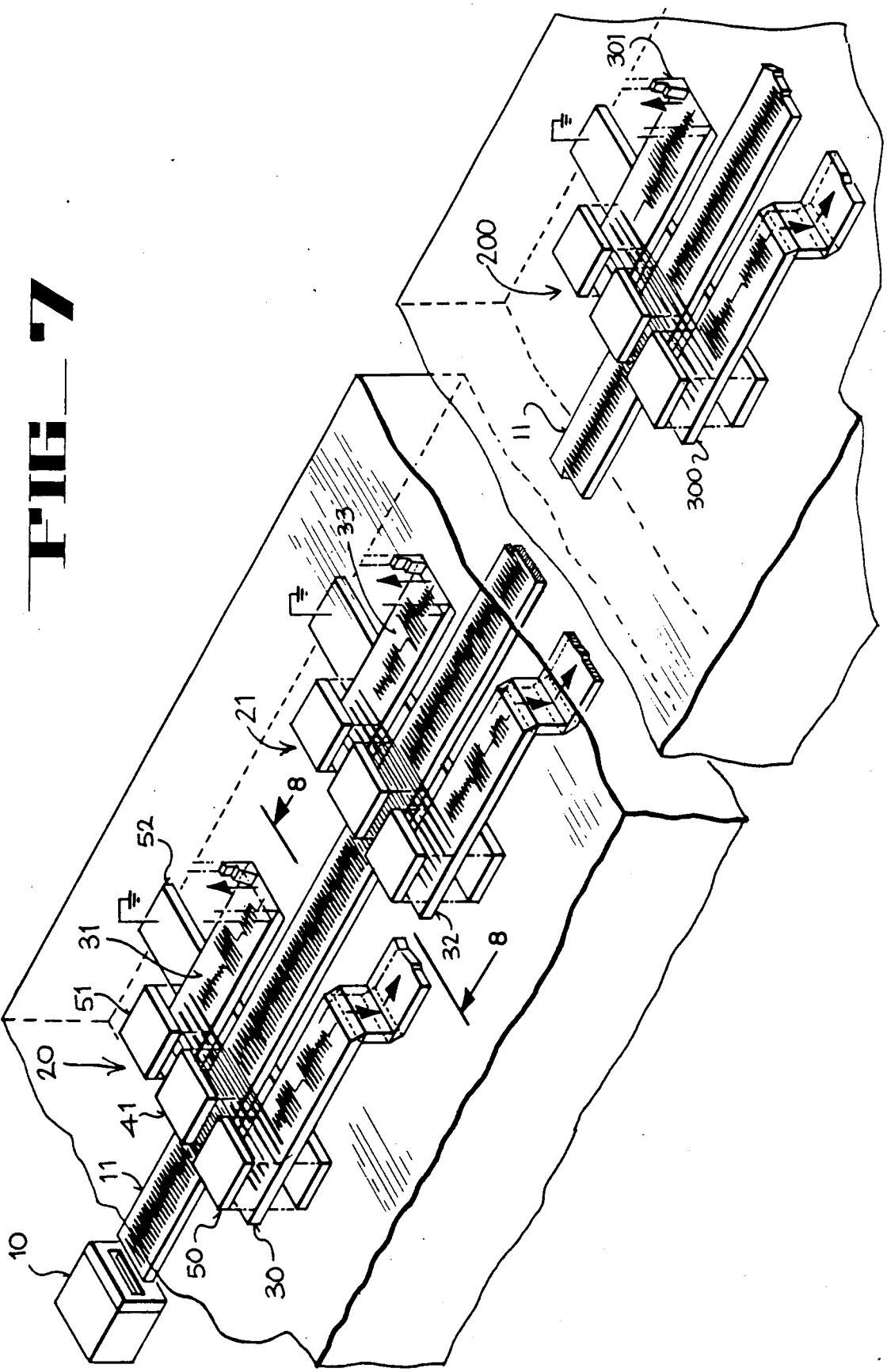

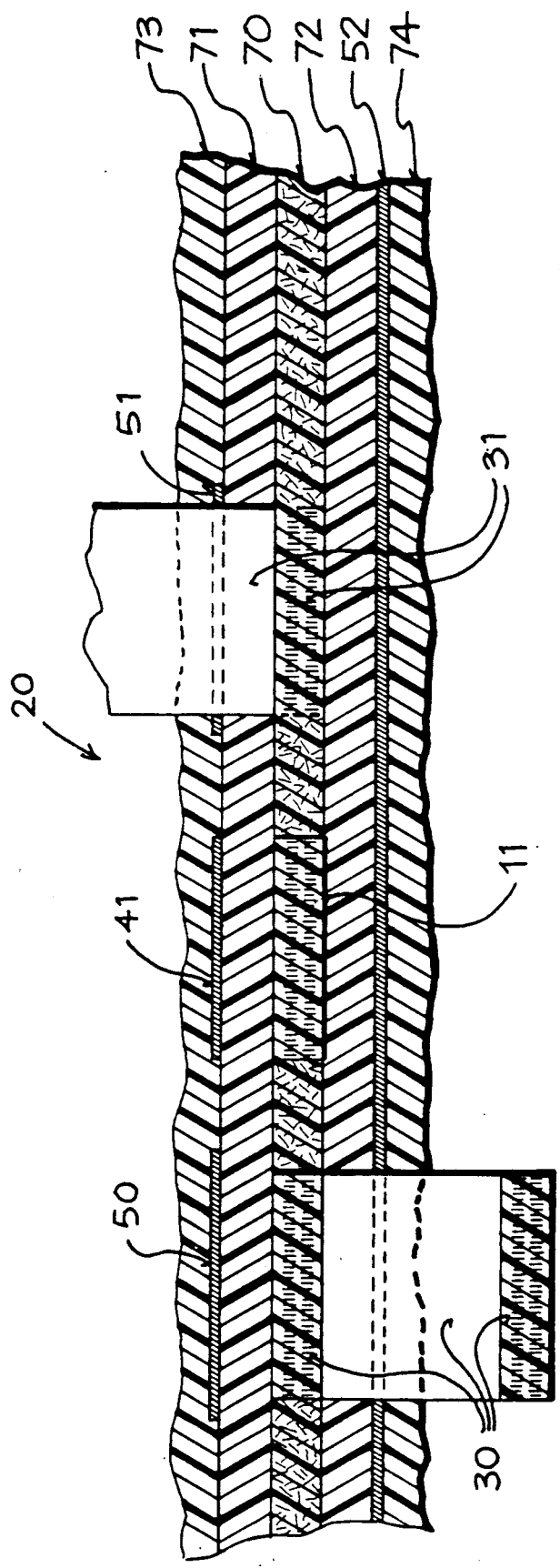
FIG_8

OPTICAL SIGNAL DISTRIBUTION NETWORK AND METHOD OF CONVERTING INDEPENDENT OPTICAL/ELECTRICAL SIGNALS

TECHNICAL FIELD

This invention relates generally to optical waveguide technology, and more particularly to a technique for efficiently converting a set of independent electrical signals into a set of corresponding independent optical signals, and for routing such optical signals over a waveguide network.

BACKGROUND OF THE INVENTION

Existing microelectronics technology can produce high-speed integrated circuits (IC's) that are capable of operating at frequencies well over one GHz. However, major difficulties have been encountered in interconnecting such high-speed IC's, and in packing them efficiently into compact multilayered boards and multichip modules. These difficulties have occurred in both analog and digital IC applications.

Conventional electrical interconnects comprising metallic conductors exhibit increasingly severe performance limitations when used for connecting high-speed IC's as operating frequencies become higher. Metallic conductors are more lossy at higher frequencies, thereby forcing IC network designers to use wider and shorter electrical interconnects that result in reduced packing and routing densities. Also, conventional electrical interconnects comprising metallic conductors exhibit significant crosstalk at high operating frequencies. (Each electrical interconnect in a high-speed IC network acts as a small antenna that broadcasts its information to neighboring interconnects and receives broadcasts from neighboring interconnects to produce crosstalk.) High power dissipation and high noise associated with conventional electrical interconnects at frequencies above a few hundred MHz have severely limited the usefulness of high-speed IC's in many applications.

The use of optical interconnects between high-speed IC's has been proposed and demonstrated in the prior art in attempts to avoid the problems associated with electrical (i.e., metallic) interconnects. With an optical interconnect, a time-varying electrical signal from an output pin on a transmitting IC can be used to directly modulate the optical output of a laser diode, or alternatively can be applied to an external modulator fed from a laser diode. Either of these techniques converts the electrical signal from the transmitting IC into a corresponding optical signal, which is conveyed from the laser diode or the external modulator to an optical receiver by a suitable optical transmission means.

The optical transmission means used for conveying the optical signal to the receiver can be an optical fiber (as typically used in long-haul telecommunications applications) or an optical waveguide (as typically used in interconnection board applications). The optical receiver can be a photoelectric detector such as an amorphous silicon photodetector or a photodiode, which converts the optical signal back into an electrical signal that is conducted to an input pin on a receiving IC. Thus, instead of using an electrical conductor to connect the output pin of the transmitting IC to the input pin of the receiving IC, an optical interconnect uses an optical transmission means in combination with means for performing electrical-to-optical conversion of the output of the transmitting IC and optical-to-electrical conversion of the input to the receiving IC.

The benefits of using optical signals instead of electrical signals to interconnect high-speed IC's include lower noise, lower propagation delay, higher packing density at high frequencies, and lower power dissipation, all of which significantly improve transmission capability. Optical signals transmitted by fibers or waveguides can carry information at very wide bandwidths, and are subject to considerably lower loss, power dissipation and crosstalk than are electrical signals transmitted by metallic conductors. However, these benefits can be realized to practical advantage, only if they offset the difficulties encountered in converting information from electrical to optical form at the output pin of the transmitting IC, and from optical to electrical form at the input pin of the receiving IC. In the prior art, difficulties in effecting electrical-to-optical and optical-to-electrical signal conversion have been major impediments to satisfactory implementation of optical interconnects in IC networks.

The primary difficulty in effecting electrical-to-optical and optical-to-electrical signal conversion in an IC network has been the requirement for an active function in the IC network to accomplish such conversion. The solution most commonly proposed in the prior art for achieving electrical-to-optical and optical-to-electrical signal conversion in an IC network has been to place an individual laser diode (either a discrete device or a monolithically integrated device) in the output line connected to each IC output pin. However, in a typical interconnection board or module having several hundred to several thousand IC output lines, the task of assembling discrete laser diode components is so complex that the cost of fabrication becomes prohibitive. Monolithic integration of laser diodes onto high-speed, high-performance IC's is a complex and difficult process that degrades the performance of both the laser diode transmitter and the IC itself. Furthermore, the area on an IC chip required for integrated laser diodes could in most cases be more effectively used for logic gates.

Other applications for which optical interconnects have been proposed include optical signal distribution networks, phased-array radars, optical backplanes, board-to-board connectors, crossbar and other types of switching networks, and, in general, all types of fiber-optic systems and integrated optical systems. However, in all such applications, problems as described above have been encountered or anticipated in attempting to implement optical interconnects. In summary, the problems inherent in the techniques of the prior art for implementing optical interconnects for IC networks are primarily as follows:

1) A separate laser diode is required for each optical interconnect. Thus, an IC network requiring thousands of interconnects would correspondingly require thousands of laser diodes.

2) The electrical signal at the output pin of each IC in the network is converted to an optical signal, either by modulating the output of a laser diode directly at high frequency or by using an external modulator to modulate a CW laser beam. Thus, for an IC network requiring thousands of interconnects, it would be necessary to accommodate the inefficiencies and operating instabilities inherent in modulating thousands of laser diodes at high frequency.

A need has been perceived in the prior art for a technique whereby IC electrical signals can be efficiently converted at high frequency into optical signals, and whereby the optical signals so produced can be efficiently a network.

SUMMARY OF THE INVENTION

It is an object of the present invention to provide a technique for efficiently converting IC electrical signals into optical signals, and for routing such optical signals over a waveguide network for interconnecting a large number of IC's.

It is more particularly an object of the present invention to provide an apparatus for efficiently converting a set of independent high-frequency IC electrical signals of wide bandwidth into a set of corresponding independent optical signals, and for distributing the optical signals so produced over a waveguide network.

A preferred embodiment of an apparatus according to the present invention comprises:

(i) an optical waveguide that functions in a manner analogous to a rail (and hence is called a "rail waveguide") for conveying optical radiation in a continuous wave (CW) mode to a specified number of signal channels, which form an optical signal distribution network;

(ii) means for directing a measured amount of power from a source of optical radiation (e.g., a laser diode) into the rail waveguide; and (iii) electrically operated switching devices called "railtaps" positioned along the rail waveguide for enabling predetermined fractions of the power in the rail waveguide to be selectively withdrawn from the rail waveguide into corresponding signal channels in response to a set of independent electrical signals applied to the railtaps, so that the optical radiation thereby introduced into the signal channels constitutes a set of independent optical signals that correspond to the set of independent electrical signals applied to the railtaps.

In accordance with the present invention, a measured amount of optical power is directed from the optical radiation source into the rail waveguide. Each of the railtaps in the preferred embodiment comprises a pair of optical waveguide segments positioned adjacent the rail waveguide, and electrode structures disposed so that separate electrodes are positioned adjacent the rail waveguide and each of the adjacent waveguide segments. The rail waveguide (or at least the portions of the rail waveguide in the vicinity of the railtaps), and also the optical waveguide segments of each railtap, are made from a material that exhibits an electro-optic effect when exposed to an electric field. Thus, when a time-varying electrical signal is applied to the electrodes of a particular railtap, the electro-optic effect thereby produced in the adjacent portion of the rail waveguide and in the adjacent pair of waveguide segments causes a predetermined fraction of the optical power supplied by the source to be transferred in complementary amounts from the rail waveguide into the pair of adjacent waveguide segments of the railtap.

One member of the pair of adjacent waveguide segments of each railtap leads to an optical signal channel, and the other member of the pair leads to an optical sump channel. The optical power transferred into the waveguide segment leading to the optical signal channel constitutes a time-varying optical signal that corresponds to the time-varying electrical signal applied to the electrodes of the railtap. The optical power transferred into the waveguide segment leading to the optical sump channel can be either discarded or used to provide a complementary-logic optical signal, depending upon the application. The optical signal channels leading from the corresponding railtaps collectively form an optical signal distribution network.

A set of independent time-varying electrical signals applied to the electrodes of corresponding railtaps positioned along the rail waveguide of an apparatus according to the present invention is converted into a set of corresponding independent optical signals, which are distributed by the optical signal channels to corresponding detectors for conversion back to time-varying electrical signals. A primary application for the present invention is to provide interconnects between high-speed integrated circuits.

DESCRIPTION OF THE DRAWING

FIG. 1 is a schematic illustration of an apparatus according to the present invention for providing modulated optical power to a waveguide network.

FIG. 2 is a schematic view of an individual railtap positioned on a rail waveguide of an apparatus as illustrated in FIG. 1.

FIG. 3 is a schematic illustration of a conventional network of optical signal channels, wherein individual optical radiation sources are required to supply optical power to corresponding optical signal channels of the network.

FIG. 4 is a schematic illustration of a conventional use of the network of FIG. 3 to convert a set of time-varying electrical signals into a corresponding set of time-varying optical signals, wherein each time-varying electrical signal is applied as a current signal to the source of optical power supplied to the corresponding optical signal channel in order to modulate the optical power in the corresponding optical signal channel.

FIG. 5 is a schematic illustration of a conventional use of the network of FIG. 3 to convert a set of time-varying electrical signals into a corresponding set of time-varying optical signals, wherein each time-varying electrical signal is applied as a voltage signal to a corresponding external modulator that modulates the optical power supplied to the corresponding optical signal channel.

FIG. 6 is a simplified perspective view, which is exploded in the vertical dimension, of a preferred embodiment of a railtap for an apparatus as schematically illustrated in FIG. 1.

FIG. 7 is a simplified perspective view, which is exploded in the vertical dimension, of a portion of an apparatus as schematically illustrated in FIG. 1.

FIG. 8 is a non-exploded cross-sectional view along line 8—8 of FIG. 7.

BEST MODE OF CARRYING OUT THE INVENTION

As illustrated in FIG. 1, an apparatus according to the present invention comprises a single source 10 of optical radiation, which is coupled in a conventional manner (as by an optical fiber) to an optical waveguide 11. In principle, the optical radiation source 10 could by any type of narrow-band light-emitting device such as a laser diode or a light-emitting diode (LED). The source 10 is operated in a continuous wave (CW) mode to produce a stable and substantially constant supply of optical power. As indicated in FIG. 1, a measured amount P of optical power is supplied by the source 10 to the waveguide 11.

The waveguide 11 is an elongate structure that functions like a rail along which optical power supplied by the source 10 can travel (i.e., be propagated), and hence is called a "rail waveguide". Switching devices called "railtaps" are positioned in sequence along the rail waveguide 11 to enable predetermined fractions of the optical power in the rail waveguide 11 to be withdrawn therefrom into corresponding optical signal channels in response to electrical signals applied to the railtaps. Typically, in an apparatus according to the present invention, the number n of railtaps positioned along the rail waveguide 11 would be in the thousands in order to feed optical power into a corresponding number n of optical signal channels comprising an optical signal distribution network. In FIG. 1, a first railtap 20, a second railtap 21, and a last railtap 200 (i.e., the nth railtap) are shown positioned sequentially downstream from each other along the rail waveguide 11.

In the preferred embodiment of the invention, each of the n railtaps comprises a pair of optical waveguide segments that are positioned adjacent the rail waveguide 11, and also comprises electrode structures disposed so that separate electrodes are positioned adjacent the rail waveguide 11 and each of the two adjacent waveguide segments. Each railtap functions to transfer a predetermined constant fraction of the optical power P (i.e., the power supplied to the rail waveguide 11 by the source 10) in complementary amounts via the corresponding pair of optical waveguide segments positioned adjacent the rail waveguide 11 into an optical signal channel and an optical sump channel, respectively. Thus, as illustrated in FIG. 1, the first railtap 20 comprises an optical waveguide segment 30 leading to an optical signal channel and an optical waveguide segment 31 leading to an optical sump channel. Similarly, the second railtap 21 comprises an optical waveguide segment 32 leading to an optical signal channel and an optical waveguide segment 33 leading to an optical sump channel, and the last railtap 200 in the sequence comprises an optical waveguide segment 300 leading to an optical signal channel and an optical waveguide segment 310 leading to an optical sump channel.

At each railtap the total amount of optical power transferred from the rail waveguide 11 into the pair of optical waveguide segments adjacent thereto remains constant, but the amount of optical power fed into either one of the optical waveguide segments of the pair (i.e., into the waveguide segment leading to the signal channel or the waveguide segment leading to the sump channel) can vary with time according to the particular application. However, the amount of optical power fed into one channel is complementary to the amount of optical power fed into the other channel of the pair. The signal channels of all the pairs of optical channels positioned adjacent the rail waveguide 11 form the optical signal distribution network.

Referring to FIG. 1, the first railtap 20 extracts a specified constant amount $C_1$ of the optical power P supplied to the rail waveguide 11 by the source 10. $C_1$ is a specified fraction $\epsilon_1$ of the power P, i.e., $C_1 = \epsilon_1 P$. The amount of optical power remaining in the waveguide 11 downstream of the first railtap 20 to be propagated into the second railtap 21 is expressed by the difference $(P - C_1)$. The second railtap 21 then extracts a specified constant amount $C_2$ of the optical power $(P - C_1)$, where $C_2$ is a specified fraction $\epsilon_2$ of the power P supplied by the source 10, i.e., $C_2 = \epsilon_2 P$. The amount of optical power remaining in the rail waveguide 11 downstream of the second railtap 21 to be propagated into the third railtap (which is not shown in FIG. 1) is expressed as $(P - C_1 - C_2)$.

FIG. 2 illustrates an intermediate kth railtap in the sequence of railtaps positioned along the rail waveguide 11. In general, the kth railtap extracts a specified constant amount $C_k$ of the optical power that has been propagated thereto after the (k−1) railtaps upstream thereof have extracted corresponding constant amounts of optical power from the rail waveguide 11. The amount of optical power propagated into the kth railtap is given by the expression $(P - C_1 - ... - C_{k-1})$, where $C_k$ is a specified fraction $\epsilon_k$ of the power P supplied by the source 10, i.e., $C_k = \epsilon_k P$. The amount of optical power remaining in the rail waveguide 11 downstream of the kth railtap is expressed as $(P_o - C_k)$, where $P_o = (P - C_1 ... - C_{k-1})$.

The last (i.e., the nth) railtap in the sequence of railtaps positioned along the rail waveguide 11 extracts a specified constant amount $C_n$ of the optical power $(P - C_1 - ... - C_{n-1})$ propagated thereto, which is a specified fraction $\epsilon_n$ of the power P, i.e., $C_n = \epsilon_n P$. Any optical power remaining in the rail waveguide 11 downstream of the last railtap is expressed by the difference $(P - \Sigma C_k)$, where the summation is from $k=1$ to $k=n$. Such remaining optical power (if any) is not used in the optical signal distribution network, but is either discarded or put to some other use. Ordinarily, it would be preferable that $P = \Sigma C_k$, so that no optical power remains in the rail waveguide 11 downstream of the last railtap.

The kth railtap shown in FIG. 2 can represent any one of the n railtaps from $k=1$ to $k=n$. In principle, the fractions $\epsilon_k$, and therefore the values of $C_k$, need not be equal for all railtaps. However, the values of $C_k$ would preferably be equal to each other for all railtaps in presently contemplated applications for the present invention.

The constant amount $C_1$ of optical power extracted from the rail waveguide 11 by the first railtap 20 is distributed in complementary fashion to the pair of optical waveguide segments 30 and 31, which serve as output ports of the first railtap 20. Thus, as illustrated in FIG. 1, an amount of optical power $X_1$ is fed by the first railtap 20 via the waveguide segment 30 into the optical signal channel, and a complementary amount of optical power $(C_1 - X_1)$ is simultaneously fed by the first railtap 20 via the waveguide segment 31 into the optical sump channel. Similarly, the second railtap 21 feeds an amount of optical power $X_2$ via the waveguide segment 32 into a corresponding signal channel, and simultaneously feeds a complementary amount of optical power $(C_2 - X_2)$ via the waveguide segment 33 into a corresponding sump channel, where the waveguide segments 32 and 33 serve as output ports of the railtap 21. In general, with reference to FIG. 2, the constant amount $C_k$ of optical power $P_o$ that is extracted from the rail waveguide 11 by the kth railtap is distributed in complementary fashion through a pair of output ports so that an amount of optical power $X_k$ is fed into a corresponding signal channel, and so that an amount of optical power $(C_k - X_k)$ is fed into a corresponding sump channel.

The kth railtap operates in response to an electrical signal $S_k$ applied thereto, as indicated in FIG. 2, so as to extract a corresponding specified constant amount $C_k$ of optical power from the rail waveguide 11, and so as to distribute the extracted optical power $C_k$ in two complementary portions, viz., $X_k$ and $(C_k-X_k)$, to the corresponding signal channel and sump channel, respectively. The electrical signal $S_k$ can vary with time, i.e., $S_k=S_k(t)$, in which case the amount of optical power $X_k$ fed into the signal channel also varies with time, i.e., $X_k=X_k(t)$. In effect, the kth railtap converts the electrical signal $S_k(t)$ into a corresponding time-dependent optical signal $X_k(t)$. In FIG. 1, the first railtap 20 is shown converting an electrical signal $S_1(t)$ into an optical signal $X_1(t)$, the second railtap 21 is shown converting an electrical signal $S_2(t)$ into an optical signal $X_2(t)$, and so forth. In principle, the electrical signal $S_k(t)$ could be measured by any time-varying electrical parameter. However, in presently contemplated applications for the present invention, the electrical signal $S_k(t)$ would be a voltage signal.

It is a significant feature of the present invention that the total amount of optical power $C_k$ extracted from the rail waveguide 11 by the kth railtap can be kept constant, or can be made to vary independently of the time-dependent electrical signal $S_k(t)$ applied thereto. This feature substantially suppresses downstream noise in the rail waveguide 11, and substantially precludes crosstalk from one railtap to another. The electrical signal $S_k$ is effectively converted by the kth railtap into the corresponding optical signal $X_k$, which varies with time precisely in accordance with the temporal variation of $S_k$. Collectively, the railtaps 20, 21, ..., 200 positioned sequentially along the rail waveguide 11 convert the set comprising all the electrical signals $S_k(t)$ applied thereto for all values of k from k=1 to k=n into a set of corresponding optical signals $X_k(t)$. In general, the individual electrical signals $S_k(t)$ are independent of each other, and therefore the resulting individual optical signals $X_k(t)$ are correspondingly independent of each other.

The signal channels, which are coupled to the optical waveguide segments represented in FIG. 1 by the reference numbers 30, 32, ..., 300 through which the optical signals $X_k$ are propagated, could be implemented as conventional waveguide structures. Similarly, the sump channels, which are coupled to the optical waveguide segments represented in FIG. 1 by the reference numbers 31, 33, ..., 301 through which the complementary amounts $(C_k-X_k)$ of power extracted by the corresponding railtaps 20, 21, ..., 200 are propagated, could also be implemented as conventional waveguide structures. Thus, the signal channels and the sump channels could be made of conventional optical fibers. However, in applications presently contemplated for the present invention, the signal and sump channels would be electro-optic channel waveguides formed in non-linear optical polymer structures as described in co-pending U.S. patent application Ser. No. 225,450 filed on July 28, 1988, the contents of which are incorporated herein by reference.

In practical applications envisioned for an optical signal distribution network according to the present invention, thousands of signal channels would be provided to enable a set consisting of the same number of independent optical signals $X_k(t)$ to be transmitted to a corresponding set of detectors. In certain applications, the complementary amounts $(C_k-X_k)$ of power extracted from the rail waveguide 11 by the corresponding railtaps 20, 21, ..., 200 might also be used, e.g., as complementary logic signals. However, in the usual applications, the complementary amounts $(C_k-X_k)$ of power extracted by the railtaps 20, 21, ..., 200 would be discarded.

In applications in which it would be appropriate to tolerate a time-varying optical power distribution within the rail waveguide 11, the individual railtaps 20, 21, ..., 200 could be designed so that the amount $C_k$ of optical power extracted from the rail waveguide 11 by each railtap varies with time, i.e., $C_k=C_k(t)$ In such cases, only a single output optical signal $X_k$ is needed at each railtap, i.e., $C_k(t)=X_k(t)$, so that each railtap would have only a single output port.

In an application in which each electrical signal $S_k(t)$ represents a digital output stream from an integrated circuit (IC), the corresponding kth railtap could be designed so that the optical signal $X_k(t)$ produced thereby has a value of substantially zero when $S_k(t)$ is zero, whereby the optical power distributed to the two output ports of the kth railtap would oscillate at the bit rate of the IC output stream. Thus, the complementary optical power outputs of the kth railtap would have only two possible values, viz., $C_k$ or zero. In this way, a digital electrical signal can be converted directly into a digital optical signal, where the power of the digital optical signal (i.e., either $C_k$ or zero) represents the value of the particular bit of the digital electrical signal. Alternatively, the kth railtap could be designed so that the optical signal $X_k(t)$ has a non-zero value less than $C_k$ when $S_k(t)=0$, whereby a "zero level" of non-zero value is provided for $X_k(t)$.

In an application in which the electrical signal $S_k(t)$ is an analog signal, the kth railtap could be designed so that the resulting optical signal $X_k(t)$ bears some specified definite relationship to the electrical signal $S_k(t)$ Thus, for example, the kth railtap could be designed so that a linear relationship exists between the optical power at one of the output ports of the kth railtap and the drive voltage of the applied electrical signal $S_k(t)$.

In accordance with the present invention, a set of independent electrical signals is converted into a set of corresponding independent optical signals. The independent optical signals are propagated to corresponding detectors via a distribution network consisting of corresponding optical signal channels, and only a single optical radiation source (e.g., a CW laser) is used to provide optical power to all the optical signal channels. In the prior art, on the other hand, as indicated in FIG. 3, as many individual optical radiation sources were required as there were optical signal channels in the distribution network (i.e., a separate optical radiation source for each optical signal channel).

Furthermore, in accordance with the present invention, the single source of optical radiation that provides optical power to all the optical signal channels of the distribution network is isolated from (and is therefore unaffected by) the conversion of the set of independent electrical signals into the corresponding set of independent optical signals. In the prior art, on the other hand, the conversion of a set of electrical signals into a corresponding set of optical signals required modulation (either directly or indirectly) of the optical power output of each one of the individual sources of optical radiation fed into the corresponding optical signal channels of the distribution network.

It is a feature of the present invention that only a small fraction of the optical power P supplied by the single source 10 of optical radiation is modulated at each of the railtaps 20, 21, ..., 200. In the prior art, on the other hand, a substantial portion of the total optical power output supplied by each of the individual sources of optical radiation had to be modulated by the corresponding applied electrical signal, which inherently required that the applied electrical signals have high voltage levels and that relatively large modulating devices be used. The technique of the present invention is a significant improvement over the prior art in enabling a set of relatively low-power electrical signals to be converted into a set of corresponding optical signals.

With reference to FIG. 4, it was conventional in certain applications of the prior art to apply each one of a set of time-dependent electric current signals to a corresponding one of the optical radiation sources that feeds a corresponding one of the optical signal channels comprising the optical signal distribution network, whereby a particular optical signal propagated in a corresponding particular optical signal channel represents the particular electric current signal i(t) applied to the optical radiation source that feeds the particular optical signal channel. With reference to FIG. 5, it was conventional in other applications of the prior art for the corresponding laser diode that feeds each optical signal channel of the optical signal distribution network to be driven by a fixed electric current i, and for a corresponding external modulator to be used to modulate the optical signal propagated in each optical signal channel in response to a time-dependent electric voltage signal v(t) applied to the external modulator.

In accordance with the present invention, optical power from a single source is directed into a rail waveguide, and specified portions of the optical power in the rail waveguide are "tapped off" into optical signal channels by corresponding railtaps located along the rail waveguide. Electrical-to-optical conversion occurs in each of the railtaps, rather than in the rail waveguide or in the source of optical radiation. It is a characteristic feature of the present invention that the power supplied by the optical radiation source is not affected by any of the electrical signals applied to the railtaps.

In principle, an optical railtap according to the present invention can be fabricated from any material that exhibits an electro-optic effect, or any other type of effect in which the application of a time-dependent electrical signal (either a current signal or a voltage signal) to the material causes a significant change in some physical property (e.g., index of refraction) of the material such that the propagation velocity of optical radiation through the material (or some other characteristic of optical radiation in the material) is concomitantly altered. Materials exhibiting an electro-optic effect include (but are not limited to) semiconductors such as GaAs (gallium arsenide), inorganic crystals such as $LiNbO_3$ (lithium niobate), and electro-optic polymers as described in the aforementioned U.S. patent application Ser. No. 225,450 and in an article by J. I. Thackara et al. entitled "Poled Electro-Optic Waveguide Formation in Thin-Film Organic Media", *Appl. Phys. Lett.*, 52 (13), Mar. 28, 1988.

In contemplated applications for the present invention, the optical railtaps would preferably be made of glassy polymer materials (e.g., thermoplastics) doped with nonlinear optical moieties that can be poled or otherwise aligned to produce an electro-optic effect. In general, glassy polymer materials doped with nonlinear optical moieties exhibit larger off-resonance electro-optic effects than do inorganic materials. Furthermore, and very importantly, glassy polymer materials doped with nonlinear optical moieties exhibit low dielectric constants and practically insignificant electrical dispersion over a frequency range extending from substantially "dc" (i.e., constant current or voltage) to well above 10 GHz, and have relatively constant electro-optic coefficients over that same frequency range. Also, such doped glassy polymer materials can be easily processed as thin multilayer films, and can easily be patterned into desired shapes for specialized applications. Additionally, the bonding of metallic electrodes to such doped glassy polymer materials can be easily accomplished.

FIG. 6 is a simplified illustration of a portion of an apparatus according to the present invention in which the laser diode 10 is seen directing a measured amount of optical power in CW mode (as indicated by waveform 40) into the rail waveguide 11. The railtap 20 shown in FIG. 6, which is the first of a large number of substantially identical railtaps disposed in sequence along the length of the rail waveguide 11, comprises the pair of optical waveguide segments 30 and 31 positioned adjacent the rail waveguide 11, and the electrode structures that enable the specified fraction $\epsilon_1$ (typically less than 0.1%) of the optical power P supplied to the rail waveguide 11 to be transferred into the waveguide segments 30 and 31 in complementary amounts.

The electrode structures of the railtap 20 comprise three physically separated electrodes 41, 50 and 51 to which the time-dependent electrical signal $S_1(t)$ is applied, and an electrode 52 that is maintained at ground potential. The electrode 41 is positioned adjacent the rail waveguide 11, and the electrodes 50 and 51 are positioned adjacent the waveguide segments 30 and 31, respectively. The grounded electrode 52 is positioned transversely with respect to the rail waveguide 11 and the pair of waveguide segments 30 and 31, and is aligned with the electrodes 41, 50 and 51 so as to enable separate electric fields to be established in the rail waveguide 11 and the waveguide segments 30 and 31. Substantially identical electrode structures are provided for the other railtaps positioned downstream of railtap 20 along the length of the rail waveguide 11.

Referring to FIG. 6, the electrical signal $S_1(t)$ applied to the electrodes 41, 50 and 51 produces separate time-varying electric fields that have substantially the same intensity in the rail waveguide 11 and in the pair of waveguide segments 30 and 31. The electric field produced in the rail waveguide 11 modulates the CW waveform 40 of the optical power P in the rail waveguide 11 so that the specified constant amount $C_1$ of the optical power P is evanescently coupled from the rail waveguide 11 into the adjacent waveguide segments 30 and 31 in complementary amounts. Specified optical power levels in the adjacent waveguide segments 30 and 31 can be obtained by controlling the resonance properties of the waveguide segments 30 and 31.

In FIG. 6, the amount $X_1$ of the optical power $C_1$ transferred into the waveguide segment 30 is indicated by waveform 60, and the complementary amount $(C_1 - X_1)$ of the optical power $C_1$ transferred into the waveguide segment 31 is indicated by waveform 61. The waveforms 60 and 61 are complementary to each other (i.e., inversely additive), so that the sum of the optical power transferred from the rail waveguide 11 into the two waveguide segments 30 and 31 remains constant. In general, the time-varying electrical signal $S_k(t)$ applied to the electrodes of the kth railtap modulates the waveform 40 of the optical power in the rail waveguide 11 at the position of the kth railtap so that the specified constant amount $C_k$ of the optical power that is to be transferred into the adjacent waveguide segments leading to the corresponding signal and sump channels for the kth railtap is evanescently coupled from the rail waveguide 11 into the adjacent waveguide segments.

In FIG. 7, the rail waveguide 11 and the sequentially disposed pairs 30 and 31, 32 and 33, ... , 300 and 301 of adjacent optical waveguide segments belonging to the corresponding railtaps 20, 21, ... , 200 are illustrated (for purposes of instruction) as if they are physically separated structures. However, in an apparatus according to a preferred embodiment of the present invention, as illustrated in cross-sectional view in FIG. 8, the rail waveguide 11 and the pairs 30 and 31, 32 and 33, ... , 300 and 301 of adjacent optical waveguide segments are integrally formed in a substantially homogeneous layer 70 of electro-optic polymeric material by a technique such as that described in the aforementioned U.S. patent application Ser. No. 225,450. Thus, as shown in FIG. 8, the rail waveguide 11 and the adjacent optical waveguide segments 30 and 31 are generally coplanar with respect to each other in the electro-optic layer 70, which could be a thin film having a thickness on the order of a few microns.

Overlying the electro-optic layer 70 is a buffer layer 71 made of a dielectric material, which isolates the optical power in the rail waveguide 11 and in the pairs 30 and 31, 32 and 33, ... , 300 and 301 of optical waveguide segments from other components of the apparatus. The buffer layer 71 could likewise be a thin film with a thickness on the order of a few microns. Underlying the electro-optic layer 70 is another buffer layer 72, which is likewise made of a dielectric material to isolate the optical power in the rail waveguide 11 and in the pairs 30 and 31, 32 and 33, ... , 300 and 301 of optical waveguide segments from other components of the apparatus, and which could likewise be a thin film with a thickness on the order of a few microns. The electrodes 41, 50 and 51 are formed on the buffer layer 71 in alignment with the rail waveguide 11 and the optical waveguide segments 30 and 31, respectively. The grounded electrode 52 is formed on the buffer layer 72, and extends transversely with respect to the rail waveguide 11 and the optical waveguide segments 30 and 31 in alignment with the electrodes 41, 50 and 51. Typically, the thickness of the electrodes 41, 50, 51 and 52 would be only about one-tenth the thickness of the buffer layers 71 and 72.

The optical signal channels to which the optical waveguide segments 30, 32, ... , 300 are coupled, which collectively comprise an optical signal distribution network, are formed in layers formed below the buffer layer 72. Likewise, the optical sump channels to which the optical waveguide segments 31, 33, ... , 301 are coupled are formed in layers above the buffer layer 71. In a particular embodiment of the invention, the layers in which the optical signal and sump channels are formed would be layers of electro-optic material, preferably of the same material as the electro-optic layer 70. As indicated in FIGS. 6, 7 and 8, optical coupling of the waveguide segments 30, 32, ... , 300 in the electro-optic layer 70 to the corresponding signal channels in their respective layers beneath the buffer layer 72 is accomplished by means of vertically extending channel waveguides with corner reflectors disposed in periscope configuration through the buffer layer 72 and through any other intervening layers. Similarly, optical coupling of the waveguide segments 31, 33, ... 301 in the electro-optic layer 70 to the corresponding sump channels in their respective layers above the buffer layer 71 is accomplished by means of vertically extending channel waveguides with corner reflectors disposed in periscope configuration through the buffer layer 71 and through any other intervening layers. In certain applications, it would be convenient to form each signal channel of the optical signal distribution network in a separate layer of electro-optic material. However, in principle there is no requirement that each signal channel be formed in a separate layer. In a particular application in which optical power fed to the sump channels is to be discarded, it might be convenient to merge the sump channels into a single sump channel formed in a single layer of electro-optic material.

It can be appreciated from a consideration of FIG. 8 that a number of different optical signal distribution devices for converting different sets of electrical signals into correspondingly different sets of optical signals can be stacked on top of each other to form a compact integral structure. Thus, as indicated in FIG. 8, a layer 73 of dielectric material (preferably of the same material as the buffer layer 71) can be formed over the buffer layer 71 so as to encase the electrodes 41, 50 and 51. Similarly, a layer 74 of dielectric material (preferably of the same material as the buffer layer 72, which is itself preferably of the same material as the buffer layer 71) can be formed over the buffer layer 72 so as to encase the grounded electrode 52. The layer 73, whose boundary with the buffer layer 71 becomes indistinct, can serve as a buffer layer separating another grounded electrode (analogous to the grounded electrode 52) from the electrodes 41, 50 and 51. Another buffer layer covering the grounded electrode formed over the buffer layer 73 separates that grounded electrode from another electro-optic layer (analogous to the electro-optic layer 70) in which a rail waveguide and adjacent optical waveguide segments (analogous to the rail waveguide 11 and the optical waveguide segments 30 and 31) are formed. Similarly, the layer 74, whose boundary with the buffer layer 72 becomes indistinct, can serve as a buffer layer separating a set of three electrodes (analogous to the electrodes 41, 50 8 and 51) from the grounded electrode 52. Another buffer layer covering the layer 72 so as to encase that set of three electrodes isolates those three 10 electrodes from yet another electro-optic layer analogous to the electro-optic layer 70. in this way, a number of electro-optic layers (analogous to the electro-optic layer 70) separated from each other by appropriate electrode structures and buffer layers can be formed.

Referring to the first railtap 20 of the apparatus shown in FIG. 7, the optical power $X_1$, which is distributed to the signal channel coupled to the waveguide segment 30, serves as an optical signal that is functionally equivalent to the electrical signal $S_1$ applied to the first railtap 20. The optical power $(C_1-X_1)$, which is distributed by the first railtap 20 to the signal channel coupled to the waveguide segment 31, can be discarded or used to provide a complementary logic signal. In general, the optical power $X_k$ that is distributed to the signal channel coupled to the corresponding waveguide segment of the kth railtap serves as an optical signal, which is functionally equivalent to the electrical signal $S_k$ applied to the kth railtap, and the optical power $(C_k-X_k)$ can be discarded or used for some other purpose.

Each of the railtaps 20, 21, ... , 200 shown in FIG. 7 produces a corresponding optical signal that is representative of the electrical signal applied thereto. Thus, a set of n independent electrical signals can be converted by n corresponding railtaps into a set of n corresponding independent optical signals. In digital applications, the electrodes of each of the individual railtaps 20, 21, ... , 200 can be biased so that all the optical power extracted from the rail waveguide 11 by any given electrode is transmitted into a sump channel to be discarded when no electrical signal (or when an electrical signal corresponding to a value of "0") is applied to the electrodes of the given railtap, and so that all the optical power extracted from the rail waveguide 11 by the given railtap is transmitted into a signal channel for routing to a detector when an electrical signal representing a value of "1" is applied to the electrodes of the given railtap.

In the apparatus illustrated in FIG. 7, the amount of optical power extracted from the rail waveguide 11 at each railtap remains constant. However, the constant amount of optical power extracted at each railtap need not be the same for all railtaps, but could be the same if so desired. The amount of optical power propagated through the rail waveguide 11 is diminished at each successive railtap, but is not affected by the time-varying electrical signals applied to the individual railtaps. Switching noise occurring in the railtaps is minimal, because the amount of optical power remaining in the rail waveguide 11 at the kth railtap is constant regardless of the value of the signal $S_k(t)$ applied to the kth railtap.

An optical signal distribution network according to the present invention has been described above in terms of a preferred embodiment. However, variations on the embodiment described above would be apparent to practitioners skilled in the art of optical waveguide technology upon perusal of the foregoing specification and the accompanying drawing. Therefore, the above description is to be understood as merely illustrative of the invention, which is defined more generally by the following claims and their equivalents.

We claim:

1. A method for converting a set of independent electrical signals into a set of corresponding independent optical signals, said method comprising the steps of:
   a) directing a measured amount of optical power from a single source into a guiding structure for propagation along a predetermined path through said guiding structure;
   b) extracting specified portions of said measured amount of optical power from said guiding structure at corresponding sequential locations along said predetermined path, each of said specified portions of said measured amount of optical power being related to a corresponding one of said independent electrical signals; and
   c) converting said specified portions of said measured amount of optical power extracted from said guiding structure into said set of independent optical signals.

2. The method of claim 1 comprising the further step of directing each one of said independent optical signals into a corresponding channel of a set of channels that collectively form an optical signal distribution network.

3. The method of claim 1 wherein the step of directing said measured amount of optical power from said single source into said guiding structure comprises directing a beam from a narrow-band light-emitting device into said guiding structure.

4. The method of claim 1 wherein the step of directing said measured amount of optical power from said single source into said guiding structure comprises directing a beam from a laser diode into said guiding structure.

5. The method of claim 1 wherein the step of directing said measured amount of optical power from said single source into said guiding structure comprises directing a beam from a light-emitting diode (LED) into said guiding structure.

6. The method of claim 1 wherein the step of directing said measured amount of optical power from said single source into said guiding structure comprises directing said measured amount of optical power directly into a channel waveguide that functions as said guiding structure.

7. The method of claim 1 wherein the step of directing said measured amount of optical power from said single source into said guiding structure comprises directing said measured amount of optical power by means of an optical fiber into a channel waveguide that functions as said guiding structure.

8. The method of claim 2 wherein the step of extracting said specified portions of said measured amount of optical power from said guiding structure at said corresponding sequential locations along said predetermined path through said guiding structure comprises applying said independent electrical signals to electrode structures positioned adjacent said guiding structure at said corresponding sequential locations, said independent electrical signals producing electro-optic effects in said guiding structure at said corresponding sequential locations, said electro-optic effects causing said specified portions of said measured amount of optical power to be coupled into corresponding channels of said optical signal distribution network.

9. The method of claim 8 wherein said electro-optic effects produced in said guiding structure cause each one of said specified portions of said measured amount of optical power to be coupled in complementary amounts into a corresponding pair of channel structures positioned adjacent said guiding structure at each corresponding one of said sequential locations along said predetermined path through said guiding structure.

10. The method of claim 9 wherein the step of converting said specified portions of said measured amount of optical power extracted from said guiding structure into said set of independent optical signals comprises using one channel structure in each pair of channel structures positioned adjacent said guiding structure at each corresponding sequential location along said predetermined path through said guiding structure as said corresponding channel of said set of channels that collectively form said optical signal distribution network.

11. A method for distributing a set of independent electrical signals, said method comprising the steps of:
   a) converting said set of independent electrical signals into a set of corresponding independent optical signals, all of said independent optical signals being derived from a single source of optical power;
   b) propagating each of said independent optical signals through a corresponding channel of a set of channels that collectively form an optical signal distribution network; and
   c) transforming said independent optical signals propagated through said channels of said optical signal distribution network into a set of reconstituted independent electrical signals, each of said reconstituted independent electrical signals representing a corresponding one of said independent electrical signals that are being distributed.

12. The method of claim 11 wherein the step of converting said set of independent electrical signals into said set of corresponding independent optical signals comprises:
 a) directing a measured amount of optical power from said single source into a guiding structure for propagation along a predetermined path through said guiding structure;
 b) extracting specified portions of said measured amount of optical power from said guiding structure at corresponding sequential locations along said predetermined path, each of said specified portions of said measured amount of optical power being related to a corresponding one of said set of independent electrical signals; and
 c) converting said specified portions of said measured amount of optical power extracted from said guiding structure into said set of corresponding independent optical signals.

13. The method of claim 12 wherein the step of extracting said specified portions of said measured amount of optical power from said guiding structure at said corresponding sequential locations along said predetermined path through said guiding structure comprises applying said independent electrical signals to electrode structures positioned adjacent said guiding structure at said corresponding sequential locations, said electrical signals producing electro-optic effects in said guiding structure at said corresponding sequential locations, said electro-optic effects causing said specified portions of said measured amount of optical power to be coupled into corresponding channels forming said optical signal distribution network.

14. An apparatus for converting a set of independent electrical signals into a set of corresponding independent optical signals, said apparatus comprising:
 a guiding structure for propagating optical power;
 b) means for directing a measured amount of optical power from a single source into said guiding structure so that said measured amount of optical power can propagate along a predetermined path through said guiding structure;
 c) means for extracting specified portions of said measured amount of optical power from said guiding structure at corresponding sequential locations along said predetermined path, each of said specified portions of said measured amount of optical power being related to a corresponding one of said independent electrical signals; and
 d) means for converting said specified portions of said measured amount of optical power extracted from said guiding structure into said set of independent optical signals, said set of independent optical signals corresponding to said set of independent electrical signals.

15. The apparatus of claim 14 further comprising means for directing each one of said independent optical signals into a corresponding channel of a set of channels that collectively form an optical signal distribution network.

16. The apparatus of claim 14 wherein said means for directing said measured amount of optical power from said single source into said guiding structure comprises means for directing a laser beam into said guiding structure.

17. The apparatus of claim 14 wherein said means for directing said measured amount of optical power from said single source into said guiding structure comprises means for directing a beam from a light-emitting diode (LED) into said guiding structure.

18. The apparatus of claim 14 wherein said means for directing said measured amount of optical power from said single source into said guiding structure comprises means for directing said measured amount of optical power directly from said source into a channel waveguide that functions as said guiding structure.

19. The apparatus of claim 14 wherein said means for directing said measured amount of optical power from said single source into said guiding structure comprises optical fiber means for directing said measured amount of optical power from said source into a channel waveguide that functions as said guiding structure.

20. The apparatus of claim 15 wherein said means for extracting said specified portions of said measured amount of optical power from said guiding structure at said corresponding sequential locations along said predetermined path through said guiding structure comprises:
 a) a set of pairs of optical channel structures positioned adjacent said guiding structure, each pair of said optical channel structures being disposed adjacent said guiding structure at a corresponding one of said sequential locations along said predetermined path;
 b) a set of electrode structures positioned adjacent said guiding structure at a corresponding one of said sequential locations along said predetermined path; and
 c) means for applying each one of said independent electrical signals to a corresponding one of said electrode structures, said independent electrical signals producing electro-optic effects in said guiding structure at said corresponding sequential locations, said electro-optic effects causing said specified portions of said measured amount of optical power to be coupled into said corresponding pairs of channel structures.

21. The apparatus of claim 20 wherein said optical channel structures have resonance properties such that said electro-optic effects produced in said guiding structure at said corresponding sequential locations cause the specified portion of said measured amount of optical power that is coupled into the corresponding pair of channel structures at each sequential location to pass in complementary amounts into the channel structures comprising said 22. An apparatus for distributing a set of independent electrical signals, said apparatus comprising:
 a) means for converting said set of independent electrical signals into a set of corresponding independent optical signals, all of said independent optical signals being derived from a single source of optical power;
 b) a set of optical channels that collectively form an optical signal distribution network;
 c) means for propagating each of said independent optical signals through a corresponding channel of a set of optical channels forming said optical signal distribution network; and
 d) means for transforming said independent optical signals propagated through said channels of said optical signal distribution network into a set of reconstituted independent electrical signals, each of said reconstituted independent electrical signals representing a corresponding one of said independent electrical signals that distributed.

23. The apparatus of claim 22 wherein said means for converting said set of independent electrical signals into said set of corresponding independent optical signals comprises:
   a) a guiding structure for propagating optical power;
   b) means for directing a measured amount of optical power from said single source into said guiding structure for propagation along a predetermined path through said guiding structure;
   c) means for extracting specified portions of said measured amount of optical power from said guiding structure at corresponding sequential locations along said predetermined path, each of said specified portions of said measured amount of optical power being related to a corresponding one of said set of independent electrical signals; and
   d) means for converting said specified portions of said measured amount of optical power extracted from said guiding structure into said set of corresponding independent optical signals.

24. An optical railtap device for simultaneously extracting a specified portion of a measured amount of optical power from a specified location along a predetermined path through an optical rail waveguide made of an electro-optic material and impressing information contained in an electrical signal onto said specified portion of said measured amount of optical power, said optical railtap device comprising:
   a) an optical channel structure positionable adjacent said optical rail waveguide at said specified location;
   b) an electrode structure positionable adjacent said optical rail waveguide at said specified location; and
   c) means for applying said electrical signal to said electrode structure so that said electrical signal produces an electro-optic effect at said specified location in said optical rail waveguide, said electro-optic effect causing said specified portion of said measured amount of optical power to be coupled from said optical rail waveguide into said optical channel structure at said specified location, said measured amount of optical power coupled into said optical channel structure having a waveform that substantially reproduces said information contained in said electrical signal.

25. The optical railtap device of claim 24 wherein said optical channel structure comprises a pair of optical waveguide segments, said optical waveguide segments having resonance properties such that said electro-optic effect produced at said specified location in said optical rail waveguide causes said specified portion of said measured amount of optical power that is coupled into said pair of optical waveguide segments to pass in complementary amounts into said optical waveguide segments.

* * * * *